June 4, 1963 K. K. KESLING 3,091,946
CABINET AND PROCESS FOR MAKING SAME
Filed Oct. 6, 1958 5 Sheets-Sheet 1
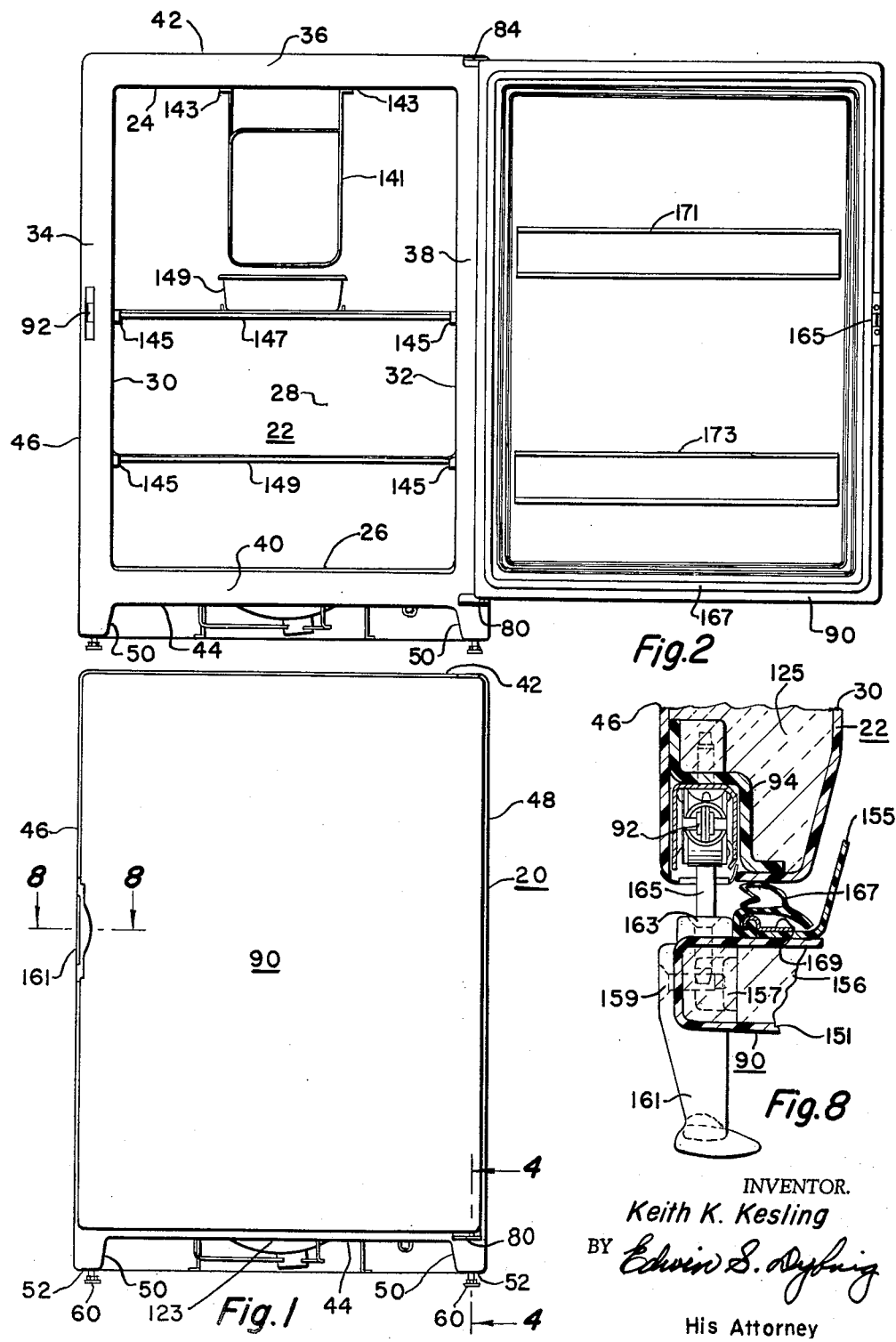
INVENTOR.
Keith K. Kesling
BY Edwin S. Dyking
His Attorney

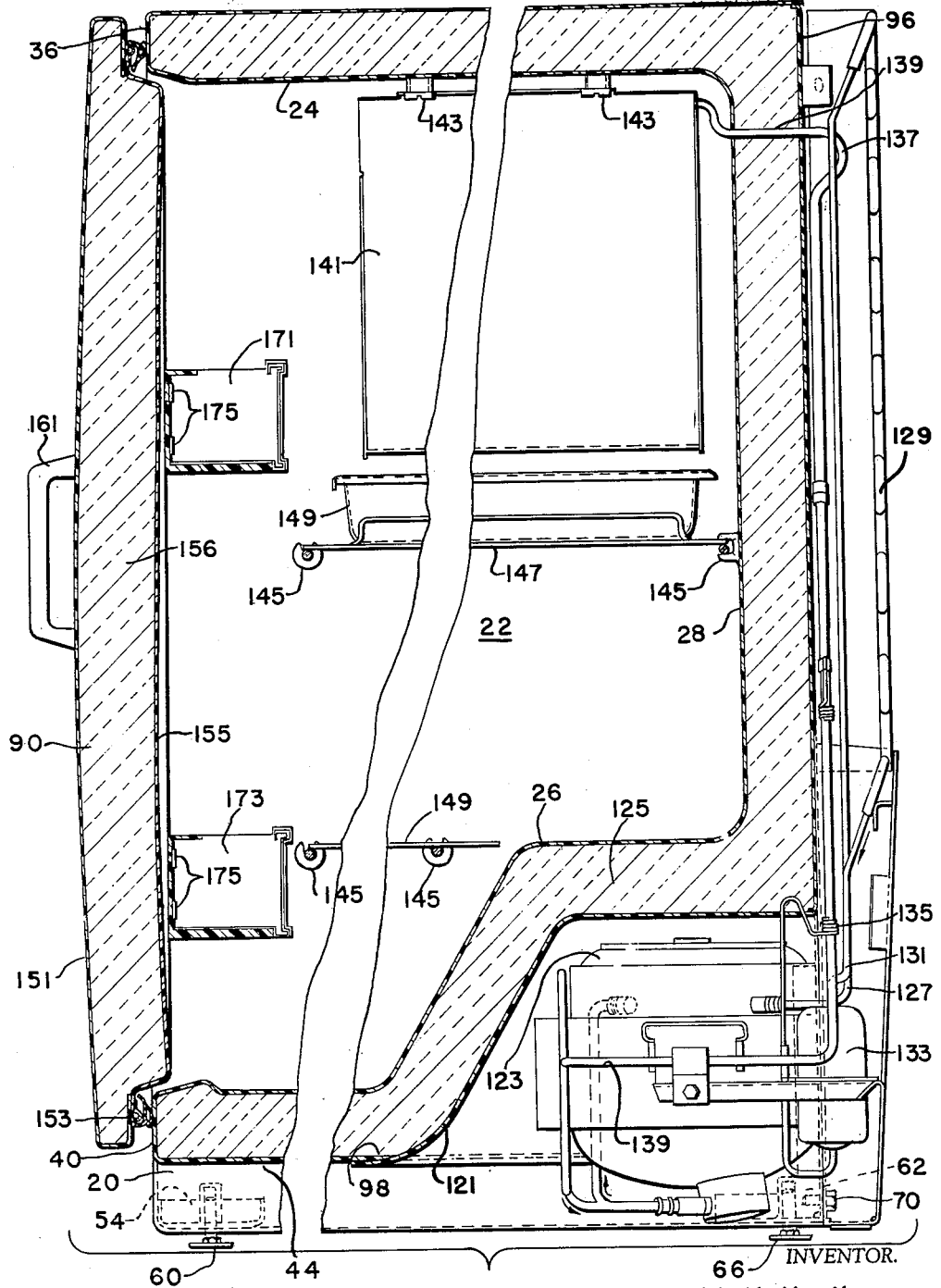

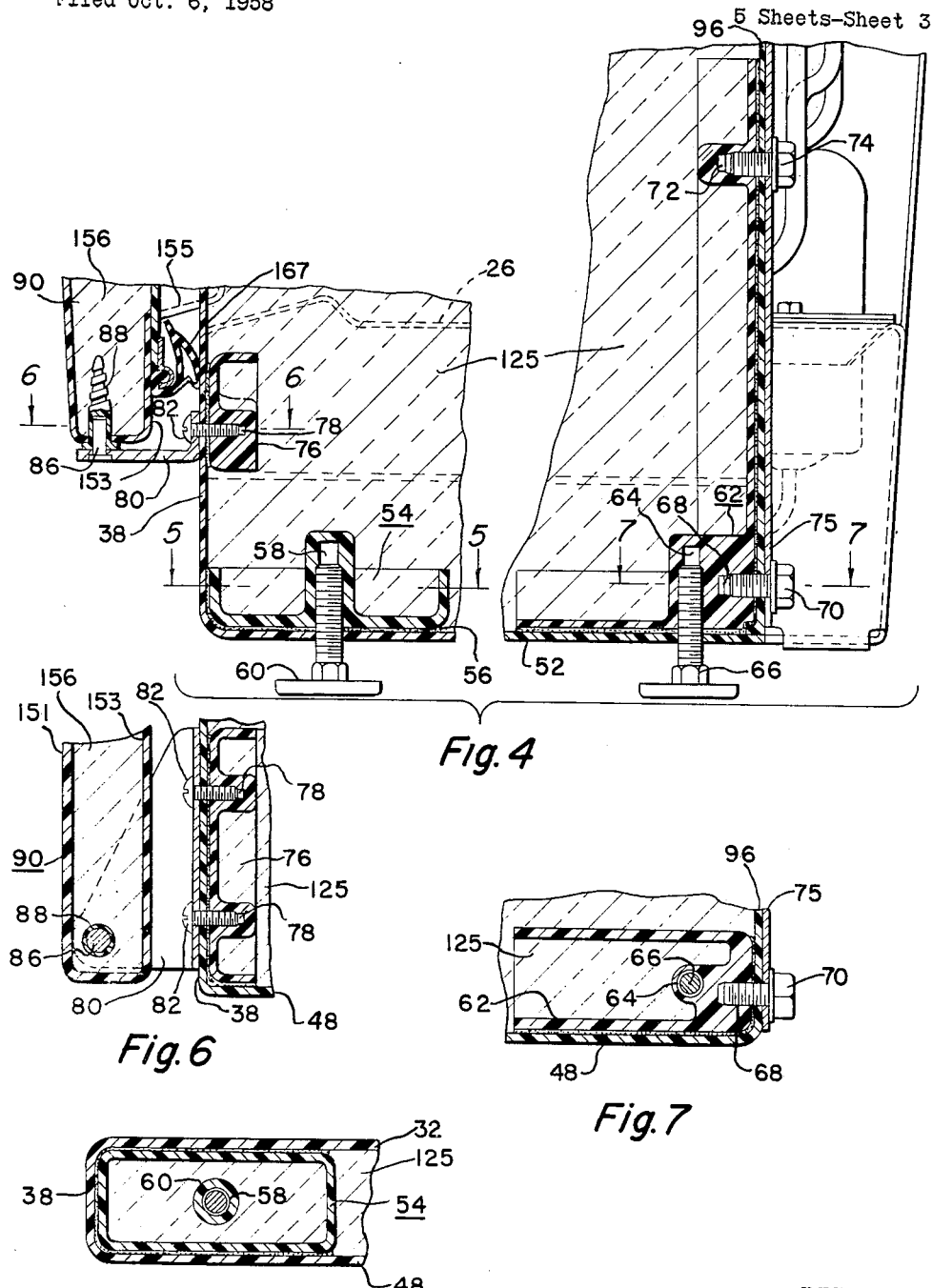

June 4, 1963 K. K. KESLING 3,091,946
CABINET AND PROCESS FOR MAKING SAME
Filed Oct. 6, 1958 5 Sheets-Sheet 4

INVENTOR.
Keith K. Kesling
BY Edwin S. Dybvig
His Attorney

June 4, 1963  K. K. KESLING  3,091,946
CABINET AND PROCESS FOR MAKING SAME
Filed Oct. 6, 1958  5 Sheets-Sheet 5
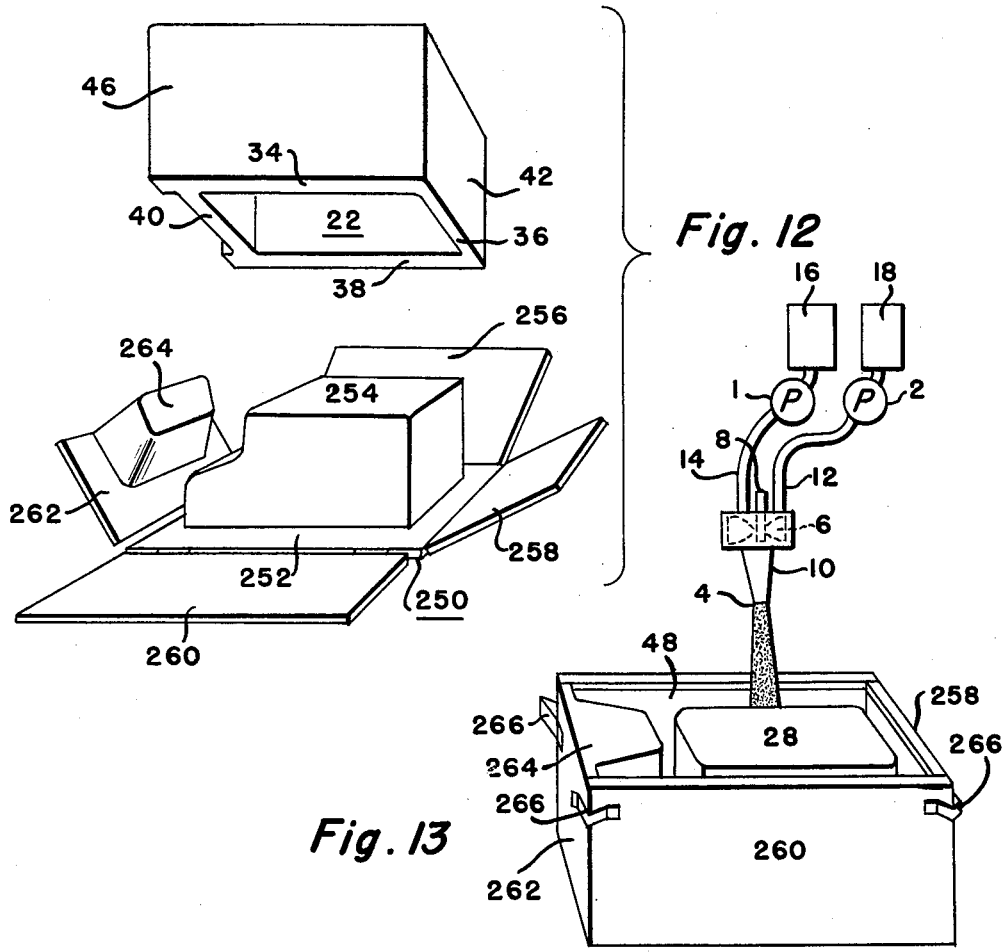
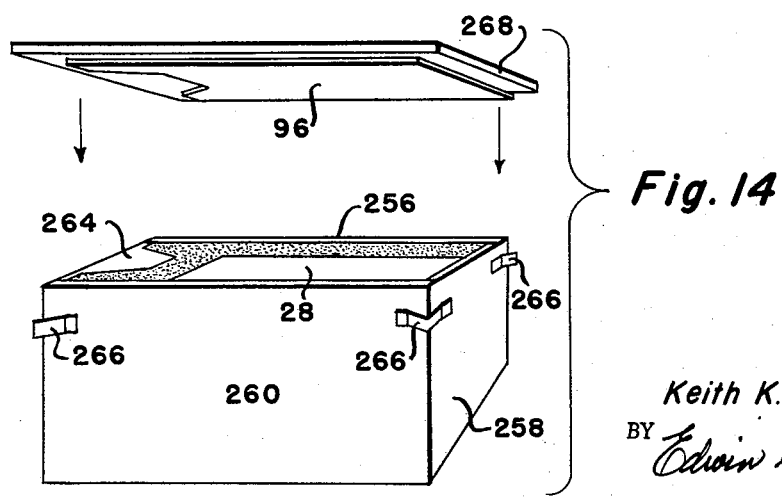
INVENTOR.
Keith K. Kesling
BY
His Attorney United States Patent Office 3,091,946
Patented June 4, 1963

3,091,946
CABINET AND PROCESS FOR MAKING SAME
Keith K. Kesling, Dayton, Ohio, assignor to General Motors Corporation, Detroit, Mich., a corporation of Delaware
Filed Oct. 6, 1958, Ser. No. 765,403
11 Claims. (Cl. 62—465)

This invention relates to insulating structures and cabinets and methods for making the same and is particularly concerned with insulating structures and cabinets vacuum formed from a plastic sheet and a plastic foam especially a rigid polyurethane foam including a fluoro substitution product of an aliphatic hydrocarbon substantially filling and retained within the cells thereof.

This application is a continuation-in-part of my co-pending application Serial No. 724,330 filed March 27, 1958, now abandoned, and assigned to the assignee of this invention.

When insulating structures and cabinets are made with sheet metal walls, expensive dies and machinery are required to form the sheet metal to the desired shape. Also, many individual parts and much assembling is necessary. There has been some interior use of plastics in insulated cabinets but these uses have depended on the sheet metal walls for reinforcement.

It is an object of this invention to provide insulating structures and cabinets which can be vacuum formed inexpensively of relatively weak thin plastic sheets without requiring any expensive dies and to reinforce the sheets by an adherent foamed insulating material of high structural strength and rigidity to form a strong and rigid refrigerator which will be low in the cost of manufacturing, particularly in materials and labor even for smaller production volumes.

It is another object of this invention to provide an insulating structure and cabinet designed so that the greater part of the inner and outer walls are formed by an inexpensive vacuum forming process from a single thin sheet of thermoplastic.

It is another object of this invention to provide inner and outer walls of a thin flexible resilient plastic sheet reinforced with adherent foamed plastic insulating material having high rigidity and strength to form a cabinet of high strength, durability and rigidity and in which reinforcing members are bonded to the inner surface of the sheet and embedded in the insulation and provided with blind holes from which the insulation is excluded for receiving threaded fastening means for supporting various parts thereon including bottom supports, door hinges, latches and also any shelves.

It is another object of this invention to provide in such a sheet plastic cabinet shell a thermal insulation and method for making the same which has all the structural qualities of previously known rigid polyurethane foams and which has greatly improved heat insulating qualities over any polyurethane foam heretofore known. In one example, this is accomplished by selecting specific polymeric materials which may be reacted with polyisocyanates, under strictly controlled conditions for eliminating or for closely limiting the evolution of carbon dioxide, to form closely cross linked polyurethanes wherein the material is foamed, preferably at atmospheric pressure and while still in a mobile state, solely by the use of one or more selected insoluble and liquefied fluorohalogenated saturated aliphatic hydrocarbons whereby a homogeneous liquid mixture is obtained. As the cross linking reaction progresses, the fluorohalogenated hydrocarbon is rendered gaseous due to the exothermic heat produced by the polymerization reaction, to cause the same to form closed cells within the material. When the cross linking reaction is completed, a rigid polyurethane foam is produced wherein each cell thereof is substantially filled with a gaseous fluorohalogenated hydrocarbon compound and, due to the specific materials selected for the reaction and the highly cross linked character of the foam, this gaseous compound is indefinitely retained within the cells of the polyurethane.

It is apparent that this material will produce a greatly improved heat insulating barrier due to the fact that the fluorohalogenated hydrocarbons selected for use have very low coefficients of thermal conductivity and that these materials are held within each cell of the polyurethane foam to improve the heat insulating qualities thereof over similar foams wherein the cells are eventually filled with air.

To this end, I propose to maintain the gas within the cells at least 93% by volume of a fluorohalogenated aliphatic hydrocarbon such as trichloromonofluoromethane. Any remainder will eventually be air. This desideratum is accomplished by closely controlling and carefully limiting the evolution of carbon dioxide gas during the polymerization reaction through control of water and acid groups in the reactants. In this connection, a minute quantity of water is normally present as an unavoidable impurity in anhydrous reactants and is normally found in anhydrous grades of chemically pure material. This impurity will react with otherwise unreacted, or free, NCO groups which will cause a minute quantity of carbon dioxide to be formed by the reaction. I have found that, if the water impurity does not exceed .25% by weight and preferably is not over .1% by weight, the carbon dioxide evolution will not affect deleteriously the coefficient of thermal conductivity of the cell gases since the carbon dioxide will not, at any time, exceed 7% by volume of the cell gases.

The percent of water in the anhydrous materials as above-noted is as low as can be obtained commercially without excessive expense and, therefore, must be tolerated in commercial practices. However, if completely anhydrous materials could be obtained, these would be used and would improve the insulating qualities of the foam.

It is to be appreciated that the reaction here obtained is one which is substantially devoid of relatively weak urea linkages heretofore present in polyurethane foams formed by conventional reactions involving the evolution of carbon dioxide. The presently disclosed foam, therefore, presents an entirely new material and one which will retain the fluorohalogenated hydrocarbon gas which is added to the reactants and is used to form the cells in differentiation to past formulations wherein the gas which is evolved in situ is not retained. The improved strength of the foam, due to elimination of the urea linkages, enhances the physical state of the cell membranes and, thus, aids in retention of gases.

The polyurethane foams formed by the several reactions disclosed herein have definitely lower moisture permeability rates than foams formed by conventional practices such as by in situ evolution of carbon dioxide. The absence of urea linkages may explain this improved permeation rate.

The theory explaining the retention of certain selected fluorohalogenated aliphatic hydrocarbon gases within the cells of selected polyurethane materials appears to be that certain selected polyurethane materials are closely cross linked and thus present a well-knit barrier to diffusion. To improve this condition, the fluorohalogenated aliphatic hydrocarbon gases selected for use are relatively heavy and present relatively large molecules. These gases do not diffuse readily through the cell membranes nor are they appreciably soluble in the polyurethane material. Actual tests have demonstrated that the system will stabilize rapidly to present a curve which becomes asymptotic to a straight line when thermal conductivity is plotted against time. This condition has been maintained under long period tests made under elevated temperature conditions. In all cases, the heat insulating qualities of the material have been tremendously improved over other polyurethane foams formed by the usual procedures as heretofore set forth.

The above and other objects are attained in the form shown in the drawings in which the inner liner, the front, top, bottom and side walls are formed of a single homogeneous sheet or a single, multiple layer sheet of a thermoplastic material by an inexpensive, heat and vacuum forming process. The portions of the walls requiring fastenings are provided with interior reinforcements preferably bonded to the inner surface of the plastic sheet at the most suitable points. These reinforcements are preferably made of plastic resin, metal or wood, preferably polyester resin containing dispersed fiber glass and are provided with blind outwardly facing holes for receiving threaded fastenings and the like. The space between the walls containing the reinforcing members is filled with a foamed plastic, preferably foamed polyester urethane plastic of high structural strength and rigidity which binds the walls and the reinforcing members together to form a rigid unitary structure capable of supporting all parts of the refrigerator. The single sheet of plastic preferably has an outer surface of sufficiently pleasing appearance that no additional exterior surface coating is required.

It is another object of this invention to provide a suitable process for making such a structure.

Further objects and advantages of the present invention will be apparent from the following description, reference being had to the accompanying drawings wherein a preferred embodiment of the present invention is clearly shown.

In the drawings:

FIGURE 1 is a front elevation of a refrigerator with the door closed, embodying one form of my invention;

FIGURE 2 is a similar view of the same refrigerator with the door open;

FIGURE 3 is a vertical sectional view of the refrigerator shown in FIGURES 1 and 2, with the door closed;

FIGURE 4 is a fragmentary vertical sectional view taken along lines 4—4 of FIGURE 1;

FIGURE 5 is a fragmentary horizontal sectional view taken along the lines 5—5 of FIGURE 4;

FIGURE 6 is a fragmentary horizontal sectional view taken along the lines 6—6 of FIGURE 4;

FIGURE 7 is a fragmentary horizontal sectional view taken along the lines 7—7 of FIGURE 4;

FIGURE 8 is a fragmentary horizontal sectional view taken along the lines 8—8 of FIGURE 1;

FIGURE 12 is a perspective view illustrating the placing of the wall structure in a mold;

FIGURE 13 is a perspective view illustrating the introduction of the foam forming materials into the insulation space in the wall structure; and FIGURE 14 is a perspective view illustrating the application of the outer back wall after the introduction of the foam forming materials.

Figure 9:
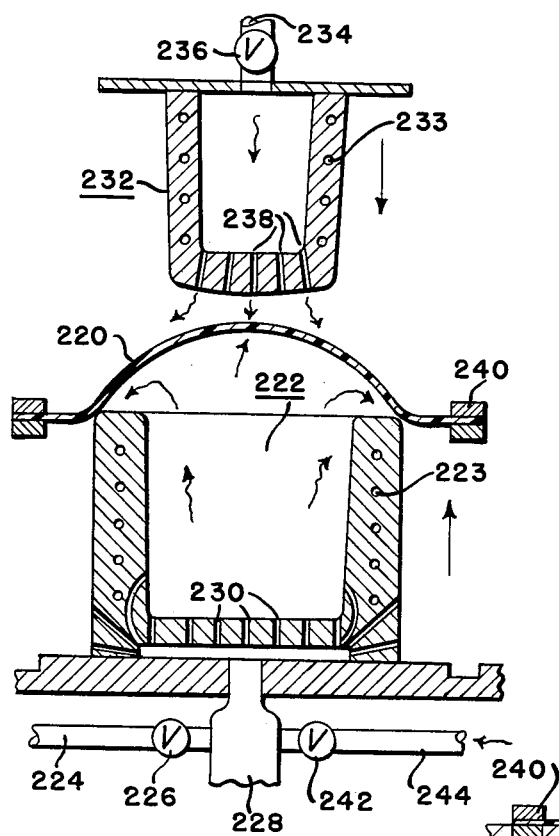
FIGURE 9 is a diagrammatic view illustrating the method of and apparatus for one step of the vacuum forming of the inner and outer walls.

Referring now to the drawings and more particularly to FIGURES 1–3, there is shown as an example of an insulating structure and cabinet a household refrigerator of apartment house size including a cabinet 20 in which pleasing outer and inner surfaces are formed by an inexpensive heat and vacuum forming process from a single relatively weak composite sheet of plastic resin material. Preferably, this plastic material has a soft elastomeric core or inner layer of a copolymer of a nitrile skeleton with acrylonitrile and styrene grafted on which has adhered to it the surface layers of a copolymer of a vinyl skeleton with acrylic molecules grafted on. This composite sheet can be made in various colors and has a good color retention. It has good resistance to wear and scratching and is capable of being deep-drawn. It has good resistance to aging and good bonding properties. This sheet forms the inner liner 22 including the top inner liner wall 24, the bottom inner liner wall 26 with the step shape, the rear inner liner wall 28 and the side inner liner walls 30 and 32. In addition to this, this single sheet of plastic material forms the front wall including the door jamb faces 34, 36, 38 and 40 as well as the outer top wall 42, the outer bottom wall 44, and the outer side walls 46 and 48. This entire structure can be drawn and formed when the sheet is brought to a proper temperature by an inexpensive vacuum forming process which does not require expensive forms, dies and apparatus. As a result, it is possible to use this process for refrigerators of relatively low volume production so that the unit cost can be kept quite low. The shape of the walls is only limited to shapes which can be formed by deep drawing processes.

Figure 11:
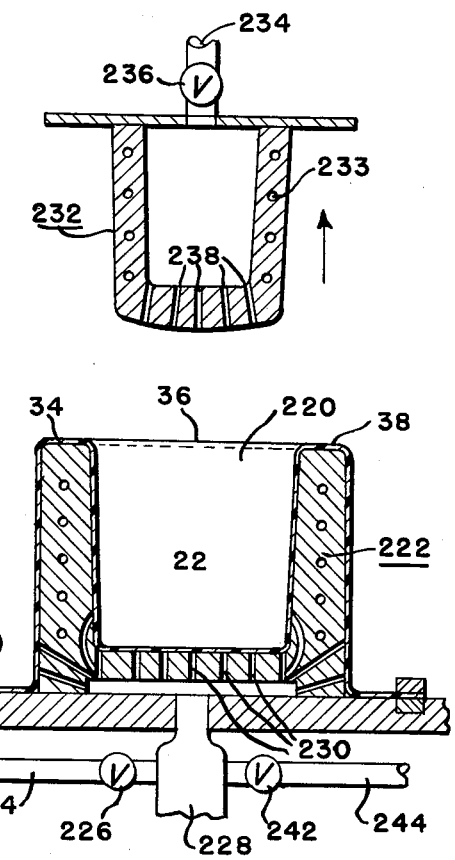
FIGURE 11 is a diagrammatic view illustrating a further step.
Figure 10:
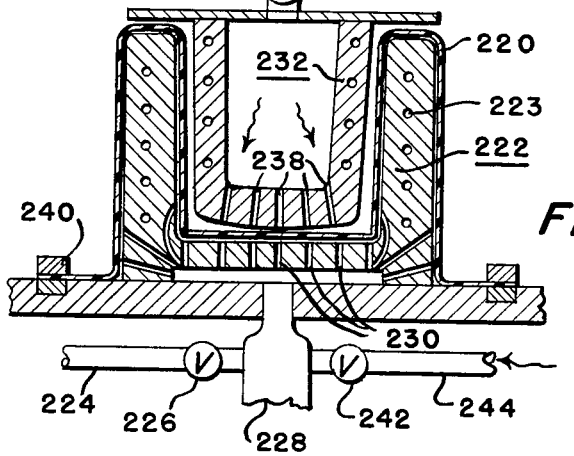
FIGURE 10 is a diagrammatic view illustrating a subsequent step.

The walls may be formed from a single thin sheet 220 of the above-identified material by the following deep-draw vacuum forming process illustrated in FIGURES 9–11, inclusive. The plastic sheet 220 of ample size is heated to about 150° F. and placed over the cavity mold 222 which is preferably kept at a temperature of about 150° F. Hot air at about 150° F. to 175° F. from the supply pipe 224 is passed upwardly through the valve 226 into a discharge chamber 228 from which the air is distributed through passages 230 in the bottom of the cavity mold 222. The hot air impinges against the bottom of the plastic sheet 220 and the heat and air pressure causes it to bulge upwardly, as shown in FIGURE 9, within about a half a second. A hollow plug 232 is connected to the hot air supply 234 at about 150° F. to 175° F. under the control of a valve 236 discharging into the interior of the plug 232. The bottom of the plug 232 is provided with discharge outlets 238 which discharge onto the upper face of the sheet 220 to keep the sheet 220 soft enough for vacuum forming and drawing.

A frame 240 is fastened to the edges of the sheet 220 as illustrated in FIGURE 9 and is moved downwardly as the plug 232 extends downwardly into the cavity of the cavity mold to the position indicated in FIGURE 10. At the end of this downward movement of the plug 232, the valve 226 is closed and a valve 242 is opened allowing the interior of the cavity mold 222 heated by steam passages 223 to be connected through the common chamber 228 to the vacuum connection 244. The vacuum continues to draw the sheet 220 into contact with the interior and exterior surfaces of the cavity mold after the plug 232 heated by steam passages 233 is removed as shown in FIGURE 11, to complete the formation of the inner liner 22, the door jamb faces 34, 36, 38 and 40 and the outer walls 42, 44, 46 and 48. While this material can be used in various thicknesses, it is desirable in the interests of economy to use a sheet having an initial thickness of about 0.160". In this operation, the plastic sheet 220 draws down to an average thickness of about .050" to .070" with a minimum of .020" to .030" at the corners. The plastic sheet 220 and the mold 222 are then cooled and the vacuum formed plastic sheet 220 is removed and trimmed to remove the flange attached to the frame 240.

Instead of the above-mentioned material for the elastomeric core or inner layer, the following plastic materials may be used depending upon the appearance required and the type and size of the cabinet needed:

Polystyrene or polymethylstyrene;

Polystyrene or polymethylstyrene modified by mechanical mixture with either styrene-butadiene copolymer or butadiene-acrylonitrile copolymer;

Terpolymers of styrene, butadiene and acrylonitrile;

Styrene-acrylonitrile copolymer;

Styrene-acrylonitrile copolymer modified by mechanical mixture with the above-named terpolymers of styrene butadiene and acrylonitrile or styrene butadiene copolymer or butadiene acrylonitrile copolymer.

The previously mentioned cores or inner layers may also have adhered to it on the one or outer side or on both sides with the same or different plastic materials selected from the following:

Acrylics
Polyesters
Polyformaldehyde
Plasticized vinyl such as:
    Polyvinyl formal
    Polyvinyl chloride
    Polyvinyl chloride-acetate Instead of laminated sheets, homogeneous plastic sheets may be selected from the following:

Any of the materials specified for the elastomeric core or inner layer or the surface layer;
Cellulose esters such as cellulose acetate or aceto butyrate;
Cellulose ethers such as ethyl cellulose;
Cellulose propionate;
Vinylidene esters.

Where conventional molding or spray techniques are feasible, the following materials may be used:

Epoxy with or without fiber glass
Phenolics with or without fiber glass
Polyesters with or without fiber glass In order that parts may be fastened to such a thin plastic shell with the assurance that they will hold, the plastic shell has bonded within its interior reinforcing members which are cast or made of a suitable resin or other materials such as:

Acrylic resins,
Cellulose acetate, nitrate, propionate;
Melamine, phenol, urea formaldehyde,
Polyamide resins,
Polymethylmethacrylate,
Polystyrene,
Vinyl esters, acetate, chloride copolymers,
Vinylidene esters, acetate, chloride copolymers,
Copolymers and terpolymers and mechanical mixtures of the above.
Various metals and wood, but preferably of polyester resin containing fiber glass particularly in the form of dispersed fibers. The bottom wall 44, for example, is arched and has downwardly extending side portions 50 extending to a lower bottom wall portion 52 on each side which meets the lowermost extremity of the side walls 46 and 48.

This forms downwardly extending portions adjacent the bottom of the side walls 46 and 48 within which are provided two front reinforcing members 54 of one of the resins previously mentioned such as polyester resin, containing dispersed fiber glass, which are bonded to the interior surface of the composite sheet by a suitable adhesive such as an epoxy resin or a rubber base cement and indicated by the reference character 56. This reinforcing member 54 contains an upraised portion provided with a blind hole 58. The front feet, or cabinet supports 60 are in the form of lower buttons or glides containing an hexagonal portion above connecting with an upward threaded extension which threads through the outer shell into the blind hole 58. The feet, or supports 60 may be rotated to raise or lower them to level and adjust the height of the cabinet from the floor.

Within the bottom wall portions 52, at the rear, there is provided a set of dual reinforcing members 62, likewise of cast polyester resin containing dispersed fiber glass or one of the other resins named or wood or metal. These reinforcements 62 contain a portion extending over a part of the bottom wall portion 52 and an integral portion extending up a part of the rear wall portion. These reinforcements 62 preferably are bonded to the inner surface of the bottom wall 52 and the rear wall 96 by an epoxy resin or a rubber base or pressure sensitive type of cement. The reinforcements 62 each contain a raised portion provided with a blind hole 64 for the threaded rear feet 66 which are identical to the front feet 60, a lower rear blind hole 68 for receiving a lower screw 70 and an upper rear blind hole 72 for receiving the upper screw 74. These screws 70 and 74 extend through the flanges 75 used to support the compressing portion of the refrigerating system.

The door jamb portion 38 is provided with interior reinforcements 76 of molded polyester resin, wood or metal or one of the other resins named containing dispersed fiber glass and containing two blind holes 78. Like the reinforcements 54 and 62, this reinforcement is bonded to the inner face of the plastic sheet by an epoxy resin or a strong rubber base cement or other adhesive. One reinforcement 76 is provided for each upper and lower hinge wing 80 having flanges fastened by the screws 82 which are threaded into the blind holes 78 of the reinforcement 76. The lower and upper hinge wings 80 and 84 are each provided with inwardly extending pins 86 which extend into the hollow stem of a plastic, tapered, screw-shaped flanged pin 88 extending tightly through apertures in the upper and lower edges of the cabinet door 90 and are embedded in the foamed insulation as shown in FIGURES 4 and 6.

The interior of the door jamb portion 34 contains a double toggle spring latch 92 which may be of the general type shown in Patent 839,876 issued January 1, 1907. This spring latch is supported by the reinforcing member 94 also of metal or wood or of one of the resins previously named such as molded polyester resin containing dispersed fiber glass. This reinforcement 94 is bonded to the inner surface of the single sheet by an epoxy resin or a strong rubber base cement or other suitable adhesive.

The space between the inner liner 22 and the outer walls 42, 44, 46 and 48 is filled with an adherent polyester urethane plastic material which has high insulating properties, excellent adherence to the plastic sheet and the reinforcements and is strong, light-weight and rigid so that it supports and reinforces the single thin sheet so well that the entire structure becomes a substantial rigid unit capable of withstanding all the impact and structural stresses required of an ordinary household refrigerator cabinet. It also supports all the reinforcement pieces. The rear wall is enclosed by a single plastic resin sheet or back panel 96 which may be fastened or bonded to the rear edges of the outer walls 42, 44, 46 and 48.

The rear portion of the bottom wall 44 has a large cut-out portion 98 which is closed by a flanged hump-shaped piece 121 which has its flanges bonded to the adjacent edges of the bottom wall 44. This hump-shaped piece 121 is preferably of the same material as the single sheet. The purpose of providing the opening 98 and the separate hump-shaped piece 121 is to provide a space for receiving the sealed motor-compressor unit 123 of the refrigerating system. If the bottom wall 44 were straight, there would be no need for the opening 98 since the single sheet could be properly drawn to form the entire bottom wall. However, since it is desired to form the humped portion, as illustrated by the number 121, it is impossible to form or draw this in a single drawing operation from the single sheet and it is therefore more economical to provide the cut-out portion 98 and to insert therein and bond to its edges the separate humped member 121 so that the single sheet can be simply drawn.

The preparation of foamed polyurethane insulation as described herein involves the introduction of the several components leading to the formation of the polyurethane foam into a mixing zone from several supply sources. Apparatus suitable for this purpose is shown schematically in FIGURE 13 of the drawing and includes an enclosed mixing chamber 10 having conduits 12 and 14 leading thereto from storage tanks 16 and 18 respectively through positive displacement pumps 1 and 2 which are capable of accurately metering the flow of material passing therethrough. The chamber 10 includes a conical nozzle portion 4 and a mixing device such as a loop-type mixing rotor 6 therein which extends into close proximity with the walls of the chamber. This rotor is carried by a shaft 8 that is connected to a high speed motor, not shown. The rotor 6 is preferably rotated at a speed of 4000 r.p.m. but may be rotated at speeds ranging between 3000 to 6000 r.p.m. This mixing device is operative to thoroughly mix the materials being fed to the chamber by the pumps from the storage tanks. The storage tanks and mixing chamber are provided with suitable temperature control devices to maintain desired temperature conditions at all times.

As the various materials pass into the chamber 10, they are mixed and are discharged therefrom through the nozzle 4. This nozzle may be positioned directly over a mold wherein the flowable polyurethane is formed into a rigid mass which fills the insulation space upon completion of the reaction.

One specific example of foamed polyester urethane plastic 125 suitable for foaming in place within the walls provided by the single sheet is as follows:

An ethylene glycol-adipic acid polyester was prepared having a hydroxyl number of about 430, an acid number of about 1.50 and a negligible water content. A portion of the polyester was reacted with toluene diisocyanate to produce an isocyanate modified polyester having an isocyanate equivalent of about .80 per 100 grams of the isocyanate modified polyester. A mixture of 100 parts by weight of the above-mentioned isocyanate modified polyester, .50 parts by weight of polyoxyethylene sorbitan monopalmitate emulsifier, and 30 parts by weight of trichloromonofluoromethane (F11) was placed in a tank and kept cool, such as below 50° F. A mixture of 60 parts by weight of the ethylene glycol-adipic acid polyester, 12 parts by weight of ethylene glycol, and .25 parts by weight of dimethyl ethanolamine and .25 parts by weight of polyoxyethylene sorbitan monopalmitate emulsifier was placed in another tank.

The components from the two tanks 16 and 18 were supplied separately through the two conduits 12 and 14 and to a mixing device 10 at a ratio of 130.50 parts by weight of the former to 72.50 parts by weight of the latter and discharged into the insulation space between the walls 22 to 52, inclusive. After about two minutes, the temperature of the reacting mixture 125 within the insulation space rose to a temperature of about 250° and produced a foamed insulation 125 in the insulation space between the inner and outer walls, as shown in FIGURES 3 and 4 and 13 and 14.

Instead of the trichloromonofluoromethane (F11), other liquids such as trichlorotrifluoroethane (F113), dichlorotetrafluoroethane (F114), dibromodichloromethane (F128:2), dibromotetrafluoroethane (F114–B2), dichlorohexafluorocyclobutane (FC316), monochloroethane, monochloromonofluoroethane (F151$a$), monochlorodifluoroethane (F142$a$), and trifluorodichloroethane (F133$e$) having boiling points ranging from 48° F. to 140° F. or mixtures thereof and having low coefficients of thermal conductivity may also be used as foaming agents.

A wide variety of materials may be used to form the rigid, heat insulating material and any of the organic diisocyanates set forth hereinbefore are suitable for this purpose. Toluene diisocyanate, due to its specific physical characteristics, is preferred and the following mixtures are set forth as useful (expressed in parts by weight).

Isocyanate ingredient A:
    80 parts 2,4 toluene diisocyanate
    20 parts 2,6 toluene diisocyanate Isocyanate ingredient B:
    75 parts 2,4 toluene diisocyanate
    25 parts 2,6 toluene diisocyanate Isocyanate ingredient C:
    90 parts 2,4 toluene diisocyanate
    10 parts 2,6 toluene diisocyanate Specific polyesters that are useful in the present invention may be made from the following recipes.

Polyester A (expressed in mols unless otherwise noted):
| | |
|---|---|
| Phthalic anhydride | 2 |
| Adipic acid | 10 |
| TMP | 18 |
| Lead (as metallic lead by weight) __percent__ | .030 |
| OH No. | 440 |
| Acid No. Max. | 1.5 |
| $H_2O$ Max. (by weight) _____percent__ | .15 |
| Viscosity (cps.) at 165° F. | 2900 |

Polyester B (expressed in mols unless otherwise noted):
| | |
|---|---|
| Phthalic anhydride | 2 |
| Adipic acid | 10 |
| TMP | 18 |
| Lead (as metallic lead by weight) __percent__ | .030 |
| OH No. | 445 |
| Acid No. Max. | .60 |
| $H_2O$ Max. (by weight) _____percent__ | .10 |
| Viscosity (cps.) at 165° F. | 4100 |

Polyester C (expressed in mols unless otherwise noted):
| | |
|---|---|
| Phthalic anhydride | 2 |
| Adipic acid | 10 |
| TMP | 18 |
| Lead (as metallic lead by weight) __percent__ | .026 |
| OH No. | 450 |
| Acid No. Max. | 1.0 |
| $H_2O$ Max. (by weight) _____percent__ | .05 |
| Viscosity (cps.) at 165° F. | 3590 |

Polyester D (expressed in mols unless otherwise noted):
| | |
|---|---|
| Phthalic anhydride | 2.1 |
| Adipic acid | 10 |
| TMP | 18.8 |
| Lead (as metallic lead by weight) | 0.0 |
| OH No. | 460 |
| Acid No. Max. | .80 |
| $H_2O$ Max. (by weight) _____percent__ | 0.14 |
| Viscosity (cps.) at 165° F. | 3870 |

Polyester E (expressed in mols unless otherwise noted):
| | |
|---|---|
| Phthalic anhydride | 2 |
| Adipic acid | 13 |
| TMP | 22 |
| OH No. | 420 |
| Acid No. Max. | .12 |
| $H_2O$ Max. (by weight) _____percent__ | .12 |
| Viscosity (cps.) at 165° F. | 3560 |

TMP noted in the above formulations is commonly known as trimethylol propane and is specifically 2,2 dihydroxymethyl 1 butanol.

All of these polyesters are prepared by conventional processes such as by cooking the several ingredients in the reaction kettle preferably with small quantities of a lead salt sufficient to provide the percentage of metallic lead noted. The lead salt sometime termed a "hardener" is used to promote esterification and may be an organic lead salt, an oxide, etc., as is well known in the art of making alkyd resins.

In all cases, the acid number, hydroxyl number, viscosity and water content of the polyester may be controlled within the limits noted by control of the processing with respect to time and temperature as is well known in the art. In this connection, the viscosities cited are of importance with respect to ease of handling of the polyester since it is apparent that if the polyesters are too viscous they are difficult to convey. Viscosities of the polyester within the ranges noted are therefore preferred.

In the preparation of the polyurethane material, I prefer to use the prepolymer technique to, in a measure, control the heat of reaction whereby reaction temperatures within easily controlled limits may be maintained. The prepolymer, as set forth herein, contains all of the organic diisocyanates used in a given recipe and a portion only of the polyester required. By pre-reacting these two ingredients, it is possible to better control the final reaction when the prepolymer is added to the remaining polyester.

If proper controls are provided, this prepolymer technique may be circumvented and, in this respect, it is possible to mix directly all the organic polyisocyanate, all the polyester and all the other ingredients in a single mixing head. It is to be understood, however, that control of this type reaction is difficult and it is generally necessary to utilize high pressures to maintain the hydrocarbon gas that is to be used in a liquefied state. Since the reaction between the isocyanate and the polyester produces considerable exothermic heat, the temperature of the reaction mixture must also be closely regulated to prevent excessive loss of gas and it is for these reasons that it is generally preferable to use the prepolymer or partial reaction technique to improve control factors.

A partial listing of prepolymers which may be used is:

Prepolymer A (expressed in parts by weight)—
    75 parts polyisocyanate ingredient A
    25 parts polyester A Prepolymer B (expressed in parts by weight)—
    80 parts isocyanate ingredient B
    20 parts polyester B Prepolymer C (expressed in parts by weight)—
    78 parts isocyanate ingredient C
    22 parts polyester D Prepolymer D (expressed in parts by weight)—
    75 parts isocyanate ingredient A
    25 parts polyester C A partial listing of activator mixtures which may be used is:

Activator mixture A (expressed in parts by weight)—
    11 parts ethylene glycol
    .25 of a part dimethylethanolamine
    .5 of a part emulsifier made up of 90% polypropylene glycol and 10% polyethylene glycol Activator mixture B (expressed in parts by weight) —
    .25 of a part of triethylamine
    .8 of a part organic silicone Activator mixture C (expressed in parts by weight) —
    .25 of a part of triethylamine
    .8 of a part emulsifier made up of 90% polypropylene glycol and 10% polyethylene glycol Activator mixture D (expressed in parts by weight)—
    11 parts ethylene glycol
    .25 of a part triethylamine
    .5 of a part sorbitan monopalmitate Activator mixture E (expressed in parts by weight)—
    3.5 parts anhydrous hexane triol
    .25 of a part N-methyl morpholine
    .5 of a part emulsifier made up of 90% polypropylene glycol and 10% polyethylene glycol The activator mixture includes a cross linking agent which is the ethylene glycol, butanediol or which may be trimethylolpropane, hexane triol, glycerol, etc.; an emulsifier such as the mixture of polypropylene and polyethylene glycols, an organic silicone, sorbitan monopalmitate, etc.; and a catlyst such as dimethylethanolamine, triethylamine, N-methyl morpholine, etc. All of these ingredients are used in the anhydrous condition.

It will be noted that activator mixtures B and C contain no cross linking agent. Increasing the quantity of polyester in the final recipe will compensate for this omission. In other words, additional polyester can be used to accomplish the cross linking in place of a separate cross linking agent, if desired.

In general, the materials in the activator mixture are used for control purposes. The cross linking agent is used to facilitate the polymerization reaction and to improve the complexity of the cross linked character of the polyurethane. The catalyst is used principally to control the rate of reaction. The emulsifier aids in controlling cell size which is of considerable importance. It is desirable that the cells be small and numerous so that the walls thereof are not easily ruptured and the number of enclosures for the gas per unit volume be at a maximum.

Specific fluorinated, halogenated, saturated aliphatic hydrocarbons are selected for use as foaming agents. One commercial source of these gases are those sold commercially by duPont under the trade name of Freon. Satisfactory Freons are Freon 11 which is trichloromonofluoromethane, Freon 114 which is dichlorotetrafluoroethane, Freon 113 which is trichlorotrifluoroethane, Freon 12–B2 which is dibromodifluoromethane, mixtures thereof, etc. These materials boil at atmospheric pressure within an easily controlled range of temperature and are substantially insoluble in the polyurethane materials which are used to contain them. Another Freon material that is useful since it is substantially insoluble in polyurethanes is Freon C316 which is an ali-cyclic compound and, specifically, dichlorohexafluorocyclobutane. While this material is not generally classified as aliphatic, it is to be understood that it is included in the broad classification of aliphatic hydrocarbons as set forth herein. This material has a relatively high boiling point of about 140° F. and also has a high molecular weight. Freon 114–B2 is also useful. This is dibromotetrafluoroethane and has a boiling point of about 118° F. Both of these materials are substantially insoluble in the polyurethane foam and have relatively high boiling points above room temperature. In this instance, it is believed that the fluorinated hydrocarbon, after formation of the foam, condenses in the cells thereof particularly when the foam is used as refrigeration insulation to form a partial vacuum in the cells, which is highly advantageous for heat insulating purposes. In these instances, it is apparent that the reaction must be carried out at temperatures above the boiling points of the specific materials in order to assure foaming of the polyurethane during the cross linking reaction thereof.

Other insoluble Freon gases having lower boiling points may also be used but, in this instance, it is obvious that pressurized equipment must be used to maintain the gas in liquified state during the mixing process. Under these conditions, therefore, a greater degree of control is necessary together with more expensive equipment.

All of the fluorinated, halogenated, saturated aliphatic hydrocarbons are not satisfactory for use in the disclosed polyurethanes. For example, compounds which are soluble in the polyurethane material are not useful for my purposes since these gases tend to dissolve into the foam even though they are good blowing agents. Thus, after the foam is formed, the gases within the cells thereof dissolve into the foam and soften the foam and are eventually lost whereby the cells become filled with air. Such gases as dichlorofluoromethane (Freon 21), monochlorodifluoromethane (Freon 22) and the chlorinated hydrocarbon gas, methylene chloride, all fall in this category.

The following examples are given to illustrate satisfactory recipes and procedures for forming polyurethane materials for heat insulating and structural purposes.

Example 1

A quantity of a mixture of prepolymer A and Freon 11 in liquified form are placed in tank 16 in proportions by weight of 100 parts of the prepolymer to 20 parts of the Freon. The ingredients are mixed and stored therein at 52° F. at atmospheric pressure.

Tank 18 is supplied with a mixture of polyester A and activator mixture A in proportions of 60 parts by weight of the polyester to 1 part of the activator. This mixture is kept at atmospheric pressure and 110° F.

The positive displacement pumps 1 and 2 are then started to supply materials from tanks 16 and 18 to the chamber 10 in portions by weight of 120 parts from tank 16 to 71.75 parts from tank 18. This mixture is then discharged in appropriate quantities into the insulation space between the inner liner 22 and the outer walls 42 to 48 in the collapsible mold shown in FIGURES 12 and 13 heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 at 75° F. as compared to a $CO_2$ expanded foam of the same polyurethane composition which has a factor of about .236.

Example 2

A quantity of a mixture of prepolymer D and Freon 11 in liquefied form is placed in tank 16 in proportions by weight of 60 parts of the prepolymer to 35 parts of the Freon. The ingredients are mixed and stored therein at 52° F. at atmospheric pressure.

Tank 18 is supplied with a mixture of polyester C and activator mixture B in proportions of 95 parts by weight of the polyester to 1 part of the activator. This mixture is kept at atmospheric pressure and 110° F.

The positive displacement pumps 1 and 2 are then started to supply materials from tanks 16 and 18 to the chamber 10 in proportions by weight of 135 parts from tank 16 to 96.05 parts from tank 18. This mixture is then discharged in appropriate quantities to the insulation space between the inner liner 22 and the outer walls 42 to 48 in the collapsible mold shown in FIGURES 12 and 13 heated to 150° F. whereupon the ingredients react to provide rigid closed cell foam wherein the cells of the foam are substantially filled with Freon 11. A foam of this nature has a density of about 2.0 pounds per foot$^3$ and a stabilized heat conductivity factor of about .145 at 75° F. as compared to a $CO_2$ expanded foam of the same polyurethane composition which has a factor of about .236 as noted in FIGURE 3 of the drawings.

Example 3

A quantity of a mixture of prepolymer A and Freon 11 in liquefied form are placed in tank 16 in proportions by weight of 100 parts of the prepolymer to 20 parts of the Freon. The ingredients are mixed and stored therein at 52° F. at atmospheric pressure.

Tank 18 is supplied with a mixture of polyester C and activator mixture C in proportions of 95 parts by weight of the polyester to 1 part of the activator. This mixture is kept at atmospheric pressure and 110° F.

The positive displacement pumps 1 and 2 are then started to supply materials from tanks 16 and 18 to the chamber 10 in proportions by weight of 120 parts from tank 16 to 95.75 parts from tank 18. This mixture is then discharged in appropriate quantities into the insulation space between the inner liner 22 and the outer walls 42 to 48 in the collapsible mold shown in FIGURES 12 and 13 heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 at 75° F. as compared to a $CO_2$ expanded foam of the same polyurethane composition which has a factor of about .236 as noted in FIGURE 3 of the drawings.

Example 4

A quantity of a mixture of prepolymer A and Freon 113 in liquefied form is placed in tank 16 in proportions by weight of 100 parts of the prepolymer to 30 parts of the Freon. The ingredients are mixed and stored therein at 70° F. at atmospheric pressure.

Tank 18 is supplied with a mixture of polyester D and activator mixture A in proportions of 60 parts by weight of the polyester to 1 part of the activator. This mixture is kept at atmospheric pressure and 100° F.

The positive displacement pumps 1 and 2 are then started to supply materials from tanks 16 and 18 to the chamber 10 in proportions by weight of 130 parts from tank 16 to 71.75 parts from tank 18. This mixture is then discharged in appropriate quantities into the insulation space between the inner liner 22 and the outer walls 42 to 48 in the collapsible mold shown in FIGURES 12 and 13 heated to 150° F. whereupon the ingredients react to provide rigid closed cell foam wherein the cells of the foam are substantially filled with Freon 113. A foam of this nature has a density of about 2.25 pounds per foot$^3$ and a stabilized heat conductivity factor of about .180 at 75° F. as compared to a $CO_2$ expanded foam of the same polyurethane composition which has a factor of about .236 as noted in FIGURE 3 of the drawings.

Example 5

A quantity of a mixture of prepolymer B and a mixture of Freons 113 and 114 in liquefied form are placed in tank 16 in proportions by weight of 100 parts of the prepolymer to 20 parts of the Freon which is made up of 25 parts by weight of Freon 113 and 75 parts by weight of Freon 114. The ingredients are mixed and stored therein at 45° F. at atmospheric pressure.

Tank 18 is supplied with a mixture of polyester B and activator mixture C in proportions of 95 parts by weight of the polyester to 1 part of the activator. This mixture is kept at atmospheric pressure and 120° F.

The positive displacement pumps 1 and 2 are then started to supply materials from tanks 16 and 18 to the chamber 10 in proportions by weight of 120 parts from tank 16 to 95.75 parts from tank 18. This mixture is then discharged in appropriate quantities into the insulation space between the inner walls 22 and the outer walls 42 to 48 in the collapsible mold shown in FIGURES 12 and 13 heated to 150° F. whereupon the ingredients react to provide rigid closed cell foam wherein the cells of the foam are substantially filled with the Freon mixture. A foam of this nature has a density of about 3.0 pounds per foot$^3$ and a stabilized heat conductivity factor of about .170 at 75° F. as compared to a $CO_2$ expanded foam of the same polyurethane composition which has a factor of about .236 as noted in FIGURE 3 of the drawings.

Example 6

A quantity of a mixture of prepolymer C and Freon 11 in liquefied form are placed in tank 16 in proportions by weight of 100 parts of the prepolymer to 20 parts of the Freon. The ingredients are mixed and stored therein at 52° F. at atmospheric pressure.

Tank 18 is supplied with a mixture of polyester C and activator mixture D in proportions of 60 parts by weight of the polyester to 1 part of the activator. This mixture is kept at atmospheric pressure and 110° F.

The positive displacement pumps 1 and 2 are then started to supply materials from tanks 16 and 18 to the chamber 10 in proportions by weight of 120 parts from tank 16 to 71.75 parts from tank 18. This mixture is then discharged in appropriate quantities into the insulation space between the inner walls 22 and the outer walls 42 to 48 in the collapsible mold heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 B.t.u./hr./° F./ sq.ft.area/inch thickness at 75° F. as compared to a $CO_2$ expanded foam of the same polyurethane composition which has a factor of about .236 B.t.u./hr./° F./ sq.ft.area/inch thickness.

*Example 7*

A quantity of a mixture of prepolymer D and Freon 11 in liquefied form are placed in tank 16 in proportions by weight of 60 parts of the prepolymer to 30 parts of the Freon. The ingredients are mixed and stored therein at 52° F. at atmospheric pressure.

Tank 18 is supplied with a mixture of polyester E and activator mixture E in proportions of 60 parts by weight of the polyester to 1 part of the activator. This mixture is kept at atmospheric pressure and 110° F.

The positive displacement pumps 1 and 2 are then started to supply materials from tanks 16 and 18 to the chamber 10 in proportions by weight of 130 parts from tank 16 to 64.25 parts from tank 18. This mixture is then discharged in appropriate quantities into the insulation space between the inner walls 22 and the outer walls 42 to 48 in a collapsible mold heated to 150° F. whereupon the ingredients react to provide rigid closed cell foam wherein the cells of the foam are substantially filled with Freon 11. A foam of this nature has a density of about 2.25 pounds per foot$^3$ and a stabilized heat conductivity factor of about .150 at 75° F. as compared to a $CO_2$ expanded foam of the same polyurethane composition which has a factor of about .236 as noted in FIGURE 3 of the drawings.

It is to be understood that the foregoing recipes and procedures are merely exemplary of satisfactory formulations and methods which may be used in carrying out my invention. Deviations in recipes, use of equivalent materials in amounts required to obtain the desired results and other changes, which are within the purview of persons skilled in the art, all come within the scope of my invention since no effort has been made to disclose all materials and combinations of materials which may be used with success. Suffice it to say that the production of formed plastic wall structures containing rigid, closed cell polyurethanes which include substantially fluorohalogenated saturated aliphatic hydrocarbon gas within the cells thereof come within the scope of my invention and provide cabinets having good structural strength and excellent heat insulating properties.

After the inner liner portion 22 and the outer walls 42–48, inclusive, have been formed, the various reinforcement pieces are bonded to these walls in their proper position by an adhesive of the type previously mentioned. The collapsible mold 250 includes a flat bottom base portion 252 upon which the door jamb faces 34, 36, 38 and 40 are adapted to rest. This base portion also includes a plug 254 having a configuration exactly fitting the interior of the liner 22. The base portion 252 has plane side pieces 256 and 260 and a plane top piece 258 hinged to it at their lower edges, which are moved against the sides 46 and 48 and the top 42 after the plastic walls are placed in position with the inner liner portion 22 over the plug 254. The bottom piece 262 is also hinged at its lower end to the bottom piece 252 and has a plug 264 adapted to extend in and support the hump or shaped piece 121 when folded into upright position.

The side pieces 256 to 262 are held in the upright position by suitable clamps 266 at each corner and such further additional reinforcements as may be required to withstand the pressures of the foam within the insulation space. The foam forming materials issue from the nozzle 10 upon the operation of the pumps 1 and 2 and the mixer 6. The nozzle 10 is movable so that the foam forming materials issuing therefrom may be uniformly distributed in the bottom of the insulation space between the inner liner portion 22 and the outer walls 42–48, inclusive. Sufficient material is charged into the insulation space in a single pouring to completely fill the space with the foam. The foam material as it forms, flows around the reinforcement members so that when the foaming is completed, the reinforcement members are permanently held in place by the foam.

After the foam forming materials are introduced into the insulation space from the mixing device 10, as illustrated in FIGURE 13, the cabinet back panel 96, held to the bottom of the cover 268 of the mold, is placed on top of the cabinet with sufficient space being provided between the back portion 28 of the inner liner and the back panel 96 to form a suitable rear insulation space. The top portion 268 of the mold is firmly held down in place while the foam forming materials react to form the foam insulation within the insulation space and spread throughout the insulation space and into the space between the back portion of the inner liner 28 and the back panel 96 until all of the insulation space is filled with the foam insulating material. The top portion 268 may have escape holes for excess foam preferably at the extreme corners of the back panel 96.

Throughout the foaming operation, the mold is held at a suitable elevated temperature such as 150° F. After the completion of the foaming operation, the entire mold and foamed cabinet are preferably placed in an oven maintained at a temperature between 100° F. and 150° F. for from thirty minutes to about two hours for post-curing. This post-curing improves the strength and the seal of the walls of the cells produced in the foam so that the insulating gases are substantially permanently held therein to provide a satisfactory insulation. After the post-curing is completed, the mold and cabinet are removed from the oven and the mold is opened and the completed structure is removed. The metal parts are then assembled to the completed structure.

It is possible to produce refrigerators and insulated cabinets, for example, wherein the insulation thickness is reduced by approximately 66% without, in any way, reducing the insulating qualities of the refrigerator over a similar refrigerator using conventional insulation. It is apparent that this tremendous reduction in insulation thickness permits a corresponding increase in the internal size of the refrigerator whereby the storage capacity of the refrigerator may be increased up to 33% without changing the over-all outside dimensions thereof. These factors are extremely important in refrigeration design and permit greater food storage capacity in the same over-all space wherein the insulating qualities of the refrigerator are equally as good as any refrigerator heretofore produced commercially.

The polyurethane heat insulation disclosed herein not only provides improved heat insulating qualities for a refrigerator or other device which is being insulated thereby but also reduces the over-all weight of the structure due to the reduced thickness of insulation and simultaneously improves the structural strength thereof since the rigid foamed in place polyurethane insulation bonds well to the internal surfaces of the cabinet materials to form a coextensive bond between the outside cabinet walls and the inside cabinet walls, whereby a tremendously strong structure is obtained. Drop tests on cabinets made under the teachings of the present invention wherein rigid foamed in place polyurethane insulation is used shows that cabinets dropped from any given height onto a floor withstand the fall considerably better than do cabinets using ordinary insulation which is not bonded to the cabinet walls. This is due to the two factors noted above. First, the weight of the cabinet is less due to the polyurethane insulation and, second, the rigidity of the cabinet is greatly improved due to the bonding of the insulation to the cabinet walls. This conditions is further enhanced by the integral nature of the several walls of the cabinet whereby the top, bottom, both side walls and the back are molded or cast in place in an integral unit. This one-piece insulation, coextensively bonded to the walls of the cabinet, greatly improves strength and rigidity due to the very nature of its structure.

If desired, any openings in the cabinet may be further sealed by a solution of polyvinyl alcohol, isopropyl alcohol and water together with a small amount of Congo red or other gelling agents.

The sealed unit 123 discharges compressed refrigerant through a discharge tube 127 to the condenser 129 which drains through a tube 131 into a filter drier 133 from which the liquid refrigerant flows to a capillary tube 135 which extends through the suction line 137 through an opening 139 in the outer and inner rear walls 96 and 28 and the insulation 125 to the evaporator 141. This evaporator 141 is supported by fastening members 143 which fasten through apertures to the inner top wall 24 without the need of any reinforcements other than the adherent foamed polyester urethane plastic insulation 125. The interior side and back walls 30, 32 and 28 are provided with shelf support plastic fastening members 145 which likewise fasten through apertures in these walls to support the upper shelf 147 and the lower shelf 149 which is aligned with the upper portion of the inner bottom wall 26. The evaporated refrigerant returns from the evaporator 141 through the suction conduit 139 to the sealed unit compressor 123. The sealed unit compressor 123 and the condenser 129 are structurally connected to form a condensing unit structure which is fastened through the flanges 75 to the rear of the cabinet by the threaded fastening means such as the screws 70 and 74 as well as additional screws which fasten into additional reinforcing members, (not shown) provided on the rear plastic wall 96 containing blind holes similar to the holes 68 and 72 for completing this support of the condenser 29. The shelf 147 may support the usual drip tray 149 beneath the evaporator 141.

The door 90 is formed of an outer plastic sheet poriton 151 provided with inner in-turned flanges 153 and an inner sheet member 155 having out-turned flanges which overlap the in-turned flanges 153. These sheet members 151 and 155 are preferably of the same or substantially the same material as that used for forming the inner and outer walls of the cabinet or any of the other materials mentioned for such walls. These are held together while the polyester urethane plastic insulation 156, similar to the insulation 125, is foamed in place within the walls of the door 90. On the opposite side of the door is provided a reinforcement 157 of molded polyester plastic containing dispersed glass fibers or any of the other materials mentioned for the reinforcement pieces. It contains blind holes for receiving the screws 159 supporting the handle 161 and screws 136 supporting the latch member 165 cooperating with the spring latch 92. The door 90 is also provided with a door seal 167 containing metal fastening strips 169 fastened by screws through the two flanges of the inner and outer sheet members 151 and 155. The door 90 is also provided with inner plastic shelves 171 and 173 fastened by plastic fasteners 175 through apertures in the rear sheet 155 of the door 90.

Through this construction and the use of these materials, an insulated cabinet structure can be made economically in a relatively low volume production to produce a very durable, efficient and attractive product.

While the embodiment of the present invention as herein disclosed constitutes a preferred form, it is to be understood that other forms might be adopted.

What is claimed is as follows:

1. An insulated cabinet including a single unitary seamless thin resilient sheet of plastic resin material extending continuously to form an inner liner portion and upright side wall portions extending substantially to the floor and a top wall portion joining the tops of the side wall portions and a bottom wall portion arched upwardly from the bottoms of the side wall portions and a front wall portion connecting the front edges of the inner liner portion and the side and top and bottom wall portions, reinforcing members bonded to the inner face of said sheet adjacent the corners of said bottom wall portion, a foamed insulation plastic material having rigidity and structural strength cast in the spaces between said inner portions and said wall portions and bonded to the adjacent surfaces of said sheet to reinforce the sheet and form a frameless self-sustaining unit of rigidity and structural strength, said reinforcing members being embedded in and supported by said insulation material and having inwardly extending blind holes therein from which the insulating material is excluded, and adjustable supports on the bottom of said cabinet having threaded portions extending in and threaded into said blind holes for supporting said cabinet.

2. An insulated cabinet including a single unitary seamless thin resilient sheet of plastic resin material extending continuously to form an inner liner portion and upright side wall and horizontal top and bottom wall portions spaced from the inner liner portions but all integrally connected around their front edges, reinforcing members bonded to the inner face of one of said wall portions, a foamed insulation plastic material having rigidity and structural strength cast in the spaces between said inner liner portions and said wall portions and bonded to the adjacent surfaces of said sheet to reinforce the sheet and form a frameless self-sustaining unit of rigidity and structural strength, said reinforcing members being embedded in and supported by said insulation material, an insulated front door for closing the front of said inner liner, latch means having latching elements mounted on said door and said sheet of plastic material, and fastening means for one of said latching elements extending into and held by one of said reinforcing members for holding said one latching element in its mounted position.

3. A refrigerator including a single unitary seamless thin resilient sheet of plastic resin material extending continuously to form an inner liner portion and upright side wall and horizontal top and bottom wall portions spaced from the inner liner portions but all integrally connected around their front edges, reinforcing members bonded to the inner face of one of said wall portions, a foamed insulation plastic material having rigidity and structural strength cast in the spaces between said inner liner portions and said wall portions and bonded to the adjacent surfaces of said sheet to reinforce the sheet and form a frameless self-sustaining unit of rigidity and structural strength, said reinforcing members being embedded in and supported by said insulation material, an insulated front door for closing the front of said inner liner, and refrigerating means for cooling the interior of said inner liner, said reinforcing members having inwardly extending blind holes from which the insulation material is excluded, and threaded fastening means connected to said refrigerating means extending into and threaded into said blind holes for supporting said refrigerating means.

4. An insulated cabinet including plastic resin material extending to form an inner liner portion and upright side wall and top and bottom portions spaced from the inner liner portions but all integrally connected around their front edges, a foamed insulation plastic material having rigidity and structural strength and being cast in the spaces between said inner liner portions and said wall portions and bonded to the adjacent surfaces of the lines and wall portions to reinforce them and form a frameless self-sustaining unit of rigidity and structural strength, a door composed of outer and inner plastic resin sheet portions containing a reinforcement member bonded to the inner face of one of said sheet portions, a foamed insulation plastic material having rigidity and structural strength and being cast in the space between said outer and inner sheet portions surrounding and holding said reinforcement member in place, said reinforcement member having inwardly extending blind holes from which insulation material is excluded, a handle for said door, and screws extending through said handle and sheet portions and being threaded into said blind holes of said reinforcement member.

5. An insulated cabinet including a single unitary seamless thin resilient sheet of plastic resin material extending continuously to form an inner liner portion and upright side wall portions extending downwardly below the bottom of the inner liner portion substantially to the supporting surface and a top wall portion joining the tops of the side wall portions and a bottom wall portion having horizontal portions extending from front to rear along and joining with the bottom of the side wall portions and a portion arched upwardly from side to side from and between said horizontal portions at the bottoms of the side wall portions from the front to the rear and a front wall portion connecting the front edges of the inner liner portion and the side and top and bottom wall portions, said inner liner being connected by the front wall portions with but otherwise spaced from the side and top and bottom wall portions, a foamed insulation plastic material having rigidity and structural strength cast in the spaces between said inner liner portion and said wall portions and between the bottom of the side wall portions and said horizontal portions and said upwardly arched bottom wall portions and bonded to the adjacent surfaces of said sheet to reinforce the sheet and form a frameless self-sustaining unit of rigidity and structural strength having thick downwardly extending supporting projections extending below the remainder of the bottom wall portions and being parallel to and forming the bottom of the side walls for supporting the cabinet, and an insulated front door for closing the front of said inner liner.

6. An insulated cabinet including a single unitary seamless thin resilient sheet of plastic resin material extending continuously to form an inner liner portion and upright side wall portions extending downwardly below the bottom of the inner liner portion substantially to the floor and a top wall portion joining the tops of the side wall portions and a bottom wall portion having horizontal portions extending from front to rear along and joining with the bottom of the side wall portions and a portion arched upwardly from side to side from and between said horizontal portions at the bottoms of the side wall portions and a front wall portion connecting the front edges of the inner liner portion and the side and top and bottom wall portions, said inner liner being connected by the front wall portions with but otherwise spaced from the side and top and bottom wall portions, the rear part of the bottom wall of the inner liner portion being provided with a raised section, said bottom wall portion having a cut-away portion beneath said raised section, a second resilient sheet of plastic material having its edges bonded to the edges of said cut-away portion and having the remaining portions raised but spaced from said raised section, a foamed insulation plastic material having rigidity and structural strength cast in the spaces between said inner liner portions and said wall portions and between the bottom of the side wall portions and said horizontal portions and said upwardly arched bottom wall portions and said second sheet and bonded to the adjacent surfaces of said sheets to reinforce the sheets and form a frameless self-sustaining unit of rigidity and structural strength having thick downwardly extending supporting projections extending below the remainder of the bottom wall portions and being parallel to and forming the bottom of the side walls for supporting the cabinet, an insulated front door for closing the front of said inner liner.

7. An insulated cabinet including a frameless wall structure entirely of plastic resin having a single unitary seamless thin resilient sheet of plastic resin material extending continuously to form an inner liner portion and upright side wall portions extending downwardly below the bottom of the inner linear portion substantially to the floor and a top wall portion joining the tops of the side wall portions and a bottom wall portion having horizontal portions extending from front to rear along and joining with the bottom of the side wall portions and a portion arched upwardly from side to side from and between said horizontal portions at the bottoms of the side wall portions and a front wall portion connecting the front edges of the inner liner portion and the side and top and bottom wall portions, reinforcing members bonded to the inner face of said horizontal portions of said sheet adjacent the corners of said bottom wall portion, a foamed insulation plastic material having rigidity and structural strength cast in the spaces between said inner liner portions and said wall portions and between the bottom of the side wall portions and said horizontal portions and said upwardly arched bottom wall portions and bonded to the adjacent surfaces of said sheet to reinforce the sheet and form a frameless self-sustaining unit of rigidity and structural strength having thick downwardly extending supporting projections extending below the remainder of the bottom wall portions and being parallel to and forming the bottom of the side walls for supporting the cabinet, said reinforcing members being embedded in and supported by said insulation material in said supporting projections, and adjustable supports on the bottom of said supporting projections of said cabinet extending up into and being adjustably mounted in said reinforcing members for supporting said cabinet.

8. A refrigerator cabinet structure having good structural strength and insulating qualities consisting of a single relatively thin, flexible, premolded resin sheet wherein the resin is taken from the class consisting of polymers of styrene, butadiene and acrylonitrile, polystyrene base polymers and polyolefine, said sheet forming spaced inner and outer wall surfaces normally movable relative to each other and capable of forming a strong bond with polyurethanes, and a heat insulating material consisting of a substantially rigid closed cell closely cross linked polyurethane foam of improved strength having the cells thereof containing essentially only a permanently retained fluorohalogenated saturated aliphatic hydrocarbon substantially insoluble in the foam, the walls of said cells having an improved seal for permanently retaining said fluorohalogenated hydrocarbon, said resin sheet and polyurethane foam forming a strong coextensive permanent bond in situ throughout their areas of contact to form a unitary structure wherein said foam provides substantially the sole support for said sheet.

9. A process for manufacturing an insulated wall structure including applying fluid pressure and heat to a plastic resin sheet to extend the central portion into a central box shape and moving the portions of the sheet extending outwardly from the rim of the central portion alongside and substantially parallel but spaced from the sides of the central box shaped portion beyond the central portion to provide outer walls spaced from the central box shaped portion, introducing into a portion of the space between the box shaped portions and the outer walls materials for subsequently forming an adherent foam plastic insulation and creating pressure and heat within said space holding the plastic sheet externally throughout in the final configuration desired to maintain the configuration and to prevent distortion, and simultaneously foaming the foam insulation in situ within said space expanding and pressing against the interior face of the plastic sheet until the plastic sheet is united to the foam insulation to form a unitary structure.

10. A process for manufacturing an insulated wall structure including applying fluid pressure and heat to a plastic resin sheet to extend the central portion into a box shape and moving the portions of the sheet extending outwardly from the rim of the central portion alongside and substantially parallel but spaced from the sides of the box shaped portion throughout major portions thereof beyond the central portion to provide outer walls spaced from the central box shaped portion, introducing into a portion of the space between the box shaped portions and the outer walls materials for subsequently forming an adherent cross linked closed cell foam plastic insulation of improved strength and creating pressure and heat within said space, placing a back panel over the space behind the box shaped portions within the outer walls, and holding the plastic sheet and the back panel to prevent distortion and simultaneously foaming the foam insulation in situ within said space expanding and pressing against the interior face of the plastic sheet and the back panel until the foam substantially fills all the spaces around the box shaped portion and the foaming is completed.

11. A refrigerator cabinet consisting of a relatively thin, flexible, premolded resin wherein the resin is taken from the class consisting of polymers of styrene, butadiene and acrylonitrile, polystyrene base polymers and polyolefine, said resin forming an inner liner portion, upright front and side outer walls and top and bottom outer walls spaced from and surrounding said inner liner portion and normally movable relative to said inner liner portion, and a heat insulation material consisting of a closely cross linked substantially closed cell polyurethane foam having rigidity and structural strength and having great adhesion to the resin material cast in between the inner surfaces of said inner liner portion and said outer walls and filling the space therebetween to form a strong coextensive permanent bond in situ therewith and provide substantially the sole support for said thin, flexible resin inner liner portion and said outer walls to form a unit of rigidity and structural strength, said polyurethane foam having the cells thereof containing essentially only a permanently retained fluorohalogenated saturated aliphatic hydrocarbon gas substantially insoluble in the foam.

References Cited in the file of this patent
UNITED STATES PATENTS

| | | |
|---|---|---|
| 2,067,015 | Munters | Jan. 5, 1937 |
| 2,091,335 | Roberts et al. | Aug. 31, 1937 |
| 2,106,840 | Gould | Feb. 1, 1938 |
| 2,216,830 | Roberts | Oct. 8, 1940 |
| 2,409,910 | Stober | Oct. 22, 1946 |
| 2,642,920 | Simon et al. | June 23, 1953 |
| 2,670,501 | Michiels | Mar. 2, 1954 |
| 2,753,642 | Sullivan | July 10, 1956 |
| 2,855,021 | Hoppe | Oct. 7, 1958 |
| 2,886,828 | Lattuca | May 19, 1959 |
| 2,957,832 | Gmitter et al. | Oct. 25, 1960 |

FOREIGN PATENTS

| | | |
|---|---|---|
| 764,330 | Great Britain | Dec. 28, 1956 |